(12) United States Patent
Angelov (10) Patent No.: US 9,028,153 B2
(45) Date of Patent: May 12, 2015

(54) OPTICAL FIBER HAVING CORE-TO-CORE ALIGNMENT

(75) Inventor: Aleksandar Kolev Angelov, Harrisburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 194 days.

(21) Appl. No.: 13/283,040

(22) Filed: Oct. 27, 2011

(65) Prior Publication Data

US 2013/0108216 A1 May 2, 2013

(51) Int. Cl.
| | | |
|---|---|---|
| G02B 6/26 | (2006.01) |
| G02B 6/42 | (2006.01) |
| G02B 6/38 | (2006.01) |
| G02B 6/35 | (2006.01) |
| G02B 6/24 | (2006.01) |

(52) U.S. Cl.
CPC ............ *G02B 6/3806* (2013.01); *G02B 6/3886* (2013.01); *G02B 6/3572* (2013.01); *G02B 6/4228* (2013.01); *G02B 6/241* (2013.01)

(58) Field of Classification Search
USPC .................................... 385/27, 50, 52, 53, 57
See application file for complete search history.

(56) References Cited

U.S. PATENT DOCUMENTS

| | | | |
|---|---|---|---|
| 4,062,620 A * | 12/1977 | Pirolli .............................. 385/57 |
| 4,844,582 A | 7/1989 | Giannini |
| 4,903,340 A | 2/1990 | Sorensen |
| 4,946,236 A * | 8/1990 | Dautartas et al. ................ 385/17 |
| 5,015,061 A | 5/1991 | Giannini |
| 6,004,045 A | 12/1999 | Snackers et al. |
| 6,102,582 A * | 8/2000 | Espindola et al. ............... 385/57 |
| 6,381,382 B2 * | 4/2002 | Goodman et al. ............... 385/22 |
| 6,542,647 B2 * | 4/2003 | Minemoto et al. ................ 385/6 |
| 6,846,429 B2 * | 1/2005 | Dean .......................... 252/62.57 |
| 7,329,128 B1 | 2/2008 | Awad |
| 7,509,018 B2 | 3/2009 | Shirokura et al. |
| 7,628,543 B2 | 12/2009 | Coronado |
| 7,646,959 B2 | 1/2010 | Sato |
| 2003/0007758 A1 | 1/2003 | Rose et al. |
| 2006/0093270 A1 | 5/2006 | Fenwick et al. |
| 2007/0212929 A1 | 9/2007 | Huang et al. |
| 2009/0016682 A1 | 1/2009 | Coronado |
| 2009/0129736 A1 | 5/2009 | Sato |
| 2009/0269943 A1 | 10/2009 | Palli et al. |

FOREIGN PATENT DOCUMENTS

| | | |
|---|---|---|
| DE | 19843164 A1 | 4/2000 |
| EP | 0207926 A2 | 1/1987 |
| EP | 0927894 A1 | 7/1999 |

(Continued)

OTHER PUBLICATIONS

International Search Report, International Application No. PCT/US2012/059178, International Filing Date Oct. 8, 2012.

*Primary Examiner* — Daniel Petkovsek (57) ABSTRACT

An optical fiber includes a first end and a second end. The optical fiber includes a core for transmitting optical signals from the first end to the second end. The core has end surfaces at the first and second ends and a cladding is positioned around a circumference of the core. Magnetic elements are provided at the end surfaces of the first end and the second end. The magnetic elements are configured to magnetically couple the core to a magnetic element at an end of a core of another optical fiber. The magnetic elements form part of a light transmission path defined by the core. The magnetic elements are optically transmissive and allow optical signals to pass therethrough.

22 Claims, 4 Drawing Sheets

(56) References Cited

FOREIGN PATENT DOCUMENTS

| | | | | |
|---|---|---|---|---|
| EP | 0932061 A2 | 7/1999 | | |
| JP | 55033196 A | * | 3/1980 | ............... G02B 7/26 |
| JP | 2001215362 A | * | 8/2001 | ............... G02B 6/40 |
| JP | 2004029633 A | * | 1/2004 | ............... G02B 6/38 |
| WO | 02058084 A2 | 7/2002 | | |

* cited by examiner

OPTICAL FIBER HAVING CORE-TO-CORE ALIGNMENT

BACKGROUND OF THE INVENTION

The subject matter described herein relates generally to optical fibers.

Optical fibers include a core typically formed from glass or plastic and configured to transmit optical signals therethrough. A cladding surrounds the core. When coupling optical fibers, the cores of each fiber must be aligned to enable the optical signals from a first fiber to be transmitted to a second fiber. Failure to properly align the cores of the fibers may result in an improper transmission of the optical signal from the first optical fiber to the second optical fiber. In particular, portions of the optical signal may not be transmitted from the first optical fiber to the second optical fiber. Improper transmissions between the fibers may result in lost data when transmitting the optical signal.

Conventional optical fibers may utilize ferrules to align the optical fibers. Other optical fibers use V-grooves structures to align the optical fibers. Alternatively, some optical fibers may include a coupling mechanism within the cladding of the fibers. However, conventional optical fibers are not without their disadvantages. In particular, conventional optical fibers are only aligned with respect to the cladding. However, aligning the cladding of two optical fibers may not result in optimal alignment of the cores. For example, the core may not be exactly centrally positioned with respect to the cladding, resulting in misalignment of the cores when the claddings are aligned.

Additionally, some known optical fibers have problems with gaps or spaces between the cores when mating to another optical fiber or electronic component. Having a space between the cores degrades the signal.

A need remains for an optical fiber that provides core-to-core alignment with another fiber.

SUMMARY OF THE INVENTION

In one embodiment, an optical fiber is provided having a first end and a second end. The optical fiber includes a core for transmitting optical signals from the first end to the second end. The core has end surfaces at the first and second ends and a cladding is positioned around a circumference of the core. Magnetic elements are provided at the end surfaces of the first end and the second end. The magnetic elements are configured to magnetically couple the core to a magnetic element at an end of a core of another optical fiber.

Optionally, the magnetic element may be a magnetic layer having magnetic nano-particles, where the magnetic layer coats at least a portion of the corresponding end surface of the core. The magnetic element may be a magnetic layer applied to the end surface of the core. The magnetic element may be an epoxy impregnated with at least one of iron-neodymium-boron alloy, iron-nickel-aluminum alloy, iron-cobalt alloy, iron oxide, barium, strontium, or lead oxide. The magnetic element may extend from the core beyond an end of the cladding. The magnetic element may form part of a light transmission path defined by the core. The magnetic element may be optically transmissive and may allow optical signals to pass therethrough.

In another embodiment, an optical fiber is provided having a first end and a second end. The optical fiber includes a core for transmitting optical signals from the first end to the second end. The core has end surfaces at the first and second ends. A magnetic element is provided at the end surfaces of the first end and the second end. The magnetic element is formed from an epoxy having magnetic particles impregnated therein. The magnetic element at the first end has a positive polarity and the magnetic element at the second end has a negative polarity.

In a further embodiment, an optical fiber is provided having a first end and a second end. The optical fiber includes a core for transmitting optical signals. The core has end surfaces at the first and second ends. Magnetic elements are provided at the end surfaces of the first end and the second end. The magnetic elements are optically transmissive and enable optical signals to pass therethrough. A light transmission path is defined through the magnetic element at the first end, through the core and through the magnetic element at the second end.

In a further embodiment, an optical fiber is provided having a first end and a second end. The optical fiber has a core for transmitting optical signals from the first end to the second end with end surfaces at the first and second ends. A cladding is positioned around a circumference of the core. Light transmissive extensions are provided at the end surfaces of the first end and the second end. The extensions being applied to the end surfaces after forming of the core and the cladding. Optionally, the extensions may be formed from a UV curable epoxy by transmitting UV light through the core.

BRIEF DESCRIPTION OF THE DRAWINGS

The presently disclosed subject matter will be better understood from reading the following description of non-limiting embodiments, with reference to the attached drawings, wherein below.

DETAILED DESCRIPTION OF THE DRAWINGS

The foregoing summary, as well as the following detailed description of certain embodiments will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Exemplary embodiments described herein include an optical fiber having a coupling mechanism configured to provide core-to-core alignment with another optical fiber or an electronic component. The optical fiber includes a core and a cladding. The core is configured to transmit optical signals therethrough. The cladding surrounds the core to prevent the optical signals from escaping the optical fiber. In an exemplary embodiment, light transmissive magnetic elements are positioned over the core at each end of the optical fiber. The magnetic element is impregnated with a magnetic material. The magnetic element is optically transmissive and enables the optical signals to pass therethrough. The optical fiber is coupled to another optical fiber or an electronic component by engaging the magnetic element with a corresponding magnetic element of the other optical fiber or electronic component. The magnetic elements couple the cores to maintain an alignment of the optical fiber cores. The optical signals from the core of one optical fiber pass through the magnetic elements and into the core of the other optical fiber or the electronic component. In an exemplary embodiment, light transmissive core extensions are provided at the ends of the core to ensure core-to-core alignment and engagement. The core extensions fill any gap that exists between the cores of the optical fibers or the optical fiber and the electronic component when assembled.

Figure 1:
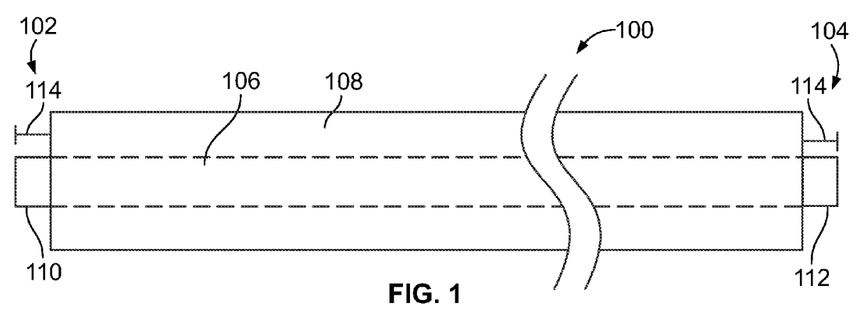
FIG. 1 is a side view of an optical fiber formed in accordance with an embodiment.

FIG. 1 is a side view of an optical fiber 100 formed in accordance with an embodiment. The optical fiber 100 extends between a first end 102 and a second end 104. The ends 102, 104 of the optical fiber 100 are configured to be coupled to other optical fibers and/or electronic components (not shown), such as a silicon photonic chip. The optical fiber 100 includes a core 106 configured to transmit optical signals therethrough. For example, the core 106 transmits optical signals between the first end 102 and the second end 104. The core 106 receives optical signals from an electronic component or other optical fiber at one of the ends 102, 104 and transmits the signal to the other end 102, 104. At the other end 102, 104, the optical signal is transmitted to another electronic component or other optical fiber. The core 106 may be formed from silica glass, a plastic material and/or any other material capable of transmitting optical signals. The core 106 includes a first end surface 103 at the first end 102 and a second end surface 105 at the second end 104.

The optical fiber 100 may be doped to form a cladding 108 around the core 106. The cladding 108 has a different index of refraction to reflect light back into the core 106 and prevent the optical signals from escaping the core 106 along a length of the optical fiber 100. The core 106 and the cladding 108 may be surrounded by other layers, such as a jacket, an armored sheath and the like to insulate and/or protect the core 106 and cladding 108 from damage.

The optical fiber 100 includes extensions at the first and second ends 102, 104 that provide core-to-core alignment and engagement with other optical fibers 100 or electronic components. In an exemplary embodiment, the extensions constitute a magnetic element 110 positioned at the first end 102 and a magnetic element 112 positioned at the second end 104.

The magnetic elements 110, 112 may at least partially cover the ends core 106 at the ends 102, 104. The magnetic elements 110, 112 are secured to the core 106. In an exemplary embodiment, the magnetic elements 110, 112 adjoin the core 106 in a light conveying manner such that the light may be transmitted to and from the core 106 through the magnetic elements 110, 112. The magnetic elements 110, 112 extend from the end surfaces 103, 105. In an exemplary embodiment, the magnetic elements 110, 112 extend a distance 114 from the respective end 102, 104 of the optical fiber 100. In an alternative embodiment, the magnetic elements 110, 112 may be generally flush with the respective end 102, 104 of the optical fiber 100. The magnetic elements 110, 112 may at least partially cover the cladding 108 in alternative embodiments. The magnetic elements 110, 112 are positioned over the ends of the core 106 of the optical fiber 100. The magnetic elements 110, 112 may be a layer or coating over the core 106. The magnetic elements 110, 112 may form part of the core 106. In other embodiments, the extensions may not be magnetic, but rather are extra material that fill any gap or void between optical fibers 100. For example, the extensions may be a light transmissive epoxy extension that extends from the core 106. The extensions (magnetic or non-magnetic) may have an index of refraction that is substantially similar to the core 106. The extensions (magnetic or non-magnetic) may be formed after the core 106 and cladding 108 are formed and may be formed by a different process.

In an exemplary embodiment, the magnetic elements 110, 112 may be formed from an epoxy material having magnetic particles impregnated therein. During one exemplary forming/attachment process, the end(s) of the optical fiber 100 is immersed in an epoxy bath and UV light is transmitted through the core 106. The epoxy is a UV-curable epoxy, and the UV light through the core 106 causes the epoxy to cure at the end of the core 106. For embodiments that have a non-magnetic extensions, the extension may be a UV-curable epoxy that is grown on the ends of the core 106 by transmitting UV light through the core 106 when the core 106 is immersed in an epoxy bath. The length of time of exposure to the bath and/or the UV light determines the size and/or length of the extension. The epoxy may be attached to the end of the core 106 and/or cladding 108 by other means or processes in alternative embodiments. The extensions may be trimmed after forming to a desired length.

In an exemplary embodiment, the magnets 110, 112 are exposed to a magnetic field to polarize the magnetic material before the magnetic elements 110, 112 are cured. The magnetic elements 110, 112 are polarized to provide at least one of a negative polarity or positive polarity. In one embodiment, the magnetic elements 110, 112 have opposite polarities. For example, the magnetic element 110 has a positive polarity and the magnetic element 112 has a negative polarity. Alternatively, the magnetic element 110 may have a negative polarity and the magnetic element 112 may have a positive polarity. In another embodiment, the magnetic elements 110, 112 may have the same polarity, positive or negative. The magnetic elements 110, 112 enable the optical fiber 100 to be coupled to an electronic component or another optical fiber having a magnetic element positioned thereon. In particular, the magnetic elements 110, 112 couple to a corresponding magnetic element of the electronic component or other optical fiber having an opposite polarity.

Having the magnetic elements 110, 112 at or on the core 106 enables core-to-core alignment of optical fibers 100. Magnetically coupling the cores 106 of optical fibers together may improve the optical signal transmission between the optical fibers 100. Additionally, coupling the cores 106 of the optical fibers 100, maintains alignment of the cores 106 when the optical fibers 100 are exposed to movement or the like. Coupling the cores 106 of the optical fibers 100 ensures that the cores 106 are aligned, even when the other parts of the optical fibers 100 are out of alignment. In an exemplary embodiment, the magnetic elements 110, 112 enable the optical signals to pass therethrough unimpeded. Accordingly, the optical signals pass from the core 106 of a first optical fiber 100, through the magnetic elements 110, 112, and into the core 106 of a second optical fiber 100. The light transmission path of the optical fiber 100 is defined through the first magnetic element 110 at the first end 102, through the core 106 and through the magnetic element 112 at the second end 104. In an exemplary embodiment, the index of refraction of the magnetic elements 110, 112 may be similar to the index of refraction of the core 106.

Figures 2, 3:
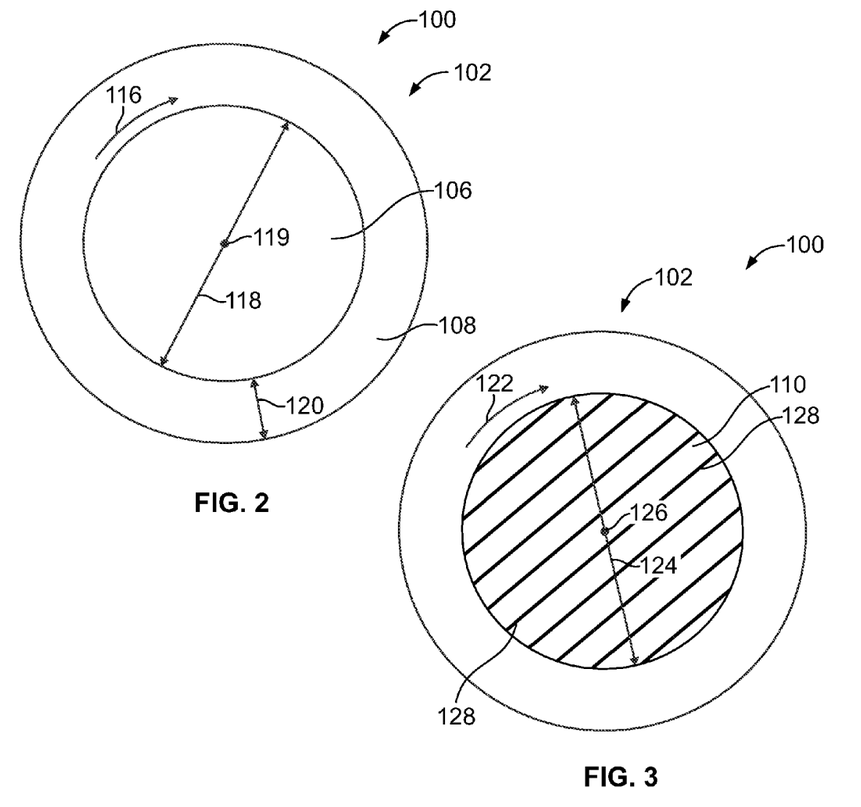
FIG. 2 is an end view of an optical fiber formed in accordance with an embodiment.
FIG. 3 is an end view of an optical fiber formed in accordance with an embodiment.

FIG. 2 is an end view of the optical fiber 100. FIG. 2 illustrates the end 102; however, it is realized that the end 104 (shown in FIG. 1) may be substantially similar to the end 102. FIG. 2 illustrates the end 102 without the magnetic element 110. The core 106 is cylindrical in shape and includes a circumference 116, a diameter 118, and a center 119. The cladding 108 extends around the circumference 116 of the core 106. The cladding 108 has a thickness 120. The thickness 120 may be selected to provide a predetermined size of the optical fiber 100.

FIG. 3 is a view of the end 102 of the optical fiber 100 having the magnetic element 110 positioned thereon. The magnetic element 110 has a circumference 122 and a diameter 124. In the illustrated embodiment, the circumference 122 is approximately equal to the circumference 116 of the core 106 (both shown in FIG. 2). In the illustrated embodiment, the diameter 124 is approximately equal to the diameter 118 (shown in FIG. 2) of the core 106. Alternatively, the magnetic element 110 may be configured with a circumference 122 and diameter 124 that is less than or greater than the circumference 116 and the diameter 118, respectively, of the core 106. The magnetic element 110 includes a center 126. The magnetic element 110 is positioned over the core 106 so that the center 126 of the magnetic element 110 is aligned with the center 119 (shown in FIG. 2) of the core 106. Accordingly, the center 119 of the core 106 is configured to align with a center of a core of another optical fiber, when the magnetic element 110 is coupled to a corresponding magnetic element of another optical fiber.

The magnetic element 110 includes a magnetic material 128 that is impregnated therein. For example, the magnetic material 128 may be impregnated into an epoxy or resin matrix. The magnetic material 128 may be nano-particles. The magnetic material 128 is sized and spaced to enable the optical signals from the core 106 of the optical fiber 100 to pass therethrough. The magnetic element 110 is optically transmissive to allow the light transmission to pass therethrough. The magnetic element 110 is provided in the transmission path and the light passes through the magnetic element 110. The magnetic material 128 may be polarized to define a positive or negatively poled magnetic element 110. The magnetic material (e.g. magnetic particles) may include at least one of iron-neodymium-boron alloy, iron-nickel-aluminum alloy, iron-cobalt alloy, iron oxide, barium, strontium, lead oxide, or the like. For example, the magnetic material 128 may be an iron-nickel-aluminum alloy inside an iron-cobalt alloy. In another embodiment, the magnetic material 128 may be a mixture of iron oxide and at least one of barium, strontium, or lead oxide.

Figure 4:
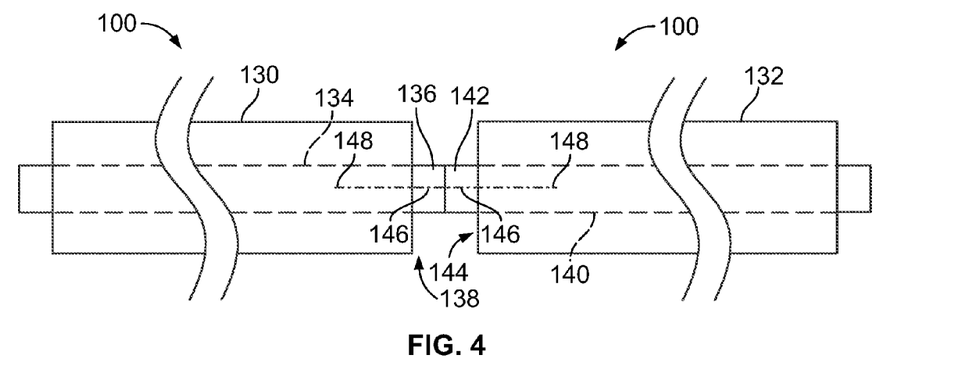
FIG. 4 is a side view of a pair of optical fibers formed in accordance with an embodiment and coupled in accordance with an embodiment.

FIG. 4 is a side view of a pair of optical fibers 100 formed in accordance with an exemplary embodiment and coupled together. The pair of optical fibers 100 includes a first optical fiber 130 and a second optical fiber 132. The first optical fiber 130 has a core 134. The core 134 is covered with a magnetic element 136 at an end 138 of the first optical fiber 130. The second optical fiber 132 has a core 140. The core 140 is covered with a magnetic element 142 at an end 144 of the second optical fiber 132. The magnetic elements 136, 142 abut against one another and are adjoined in a light conveying manner. The magnetic element 136 has a first polarity and the magnetic element 142 has a second polarity that is opposite the first polarity. As such, the magnetic element 136 and the magnetic element 142 are attracted to one another.

The magnetic element 136 is coupled to the magnetic element 142 to couple the core 134 of the first optical fiber 130 to the core 140 of the second optical fiber 132. The core 134 and the core 140 are aligned by the magnetic elements 136 and 142. In one embodiment, the core 134 and the core 140 are aligned with respect to a center 146 (for example, the center 126 shown in FIG. 3) of each magnetic element 136, 142, and a center 148 (for example, the center 119 shown in FIG. 2) of each core 134, 140. The cores 134 and 140 are aligned to enable optical signals to pass between the cores 134 and 140. The optical signals pass from one of the cores 134 or 140, through the magnetic elements 136 and 142, and into the other core 134 or 140.

Figure 5:
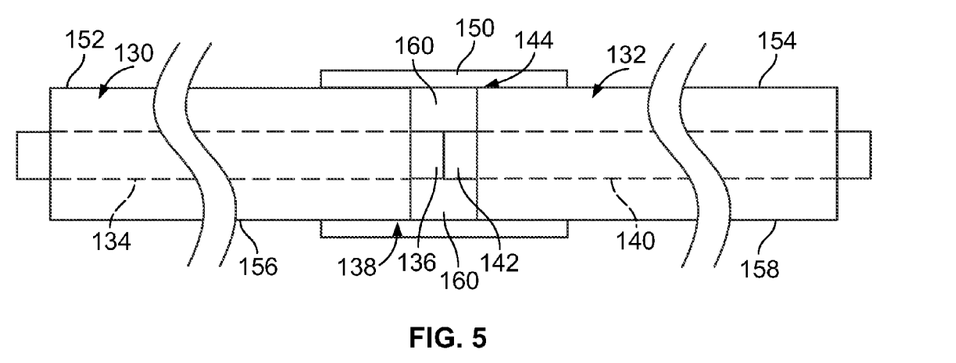
FIG. 5 is a side view of a pair of optical fibers formed in accordance with an embodiment and coupled in accordance with an embodiment.

FIG. 5 is a side view of a pair of optical fibers 130 and 132 having a sealing member 150 coupled thereto. The sealing member 150 may be a sleeve formed from plastic, rubber, or the like. Alternatively, the sealing member 150 may be heat shrink tubing that is heat shrunk onto the optical fibers 130 and 132. In another embodiment, the sealing member 150 may be a metallic sleeve, a polymer molded sleeve or a rod that may be crimped or clamped onto the ends of the optical fibers 130 and 132. The sealing member 150 extends over both optical fibers 130 and 132. For example, the sealing member 150 extends from the end 138 of the first optical fiber 130 to the end 144 of the second optical fiber 132.

The sealing member 150 may provide additional support to the optical fibers 130 and 132. For example, the sealing member 150 may be provided to prevent the optical fibers 130 and 132 from becoming separated (e.g. when the optical fibers 130 and 132 are moved or if force is applied to either of the optical fibers 130 and 132). The sealing member 150 may also prevent movement or misalignment of the magnetic elements 136, 142, if the optical fibers are moved or subjected to a force. The sealing member 150 may also provide a protective layer to the optical fibers 130 and 132. For example, the sealing member limits and/or prevents exposure of the magnetic elements 136 and 142 to the environment. As such, the magnetic elements 136 and 142 are protected from being dislodged from the cores 134 and 140 of the optical fibers 130 and 132, respectively. In another embodiment, the sealing member 150 may protect the magnetic elements 136 and 142 and/or the cores 134 and 140 of the optical fibers 130 and 132, respectively, from becoming damaged. Additionally, the sealing member 150 may prevent damage to claddings 152 and 154 that surround the cores 134 and 140 of the optical fibers 130 and 132, respectively. In yet another embodiment, the sealing member 150 may prevent the optical signals being transmitted between the optical fibers 130 and 132 from escaping the optical fibers 130 and 132 through the magnetic elements 136 and 142.

In the illustrated embodiment, the sealing member 150 extends along outer surfaces 156 and 158 of the optical fibers 130 and 132, respectively. Accordingly, gaps 160 may be formed between the magnetic elements 136, 142 and the sealing member 150.

Figure 6:
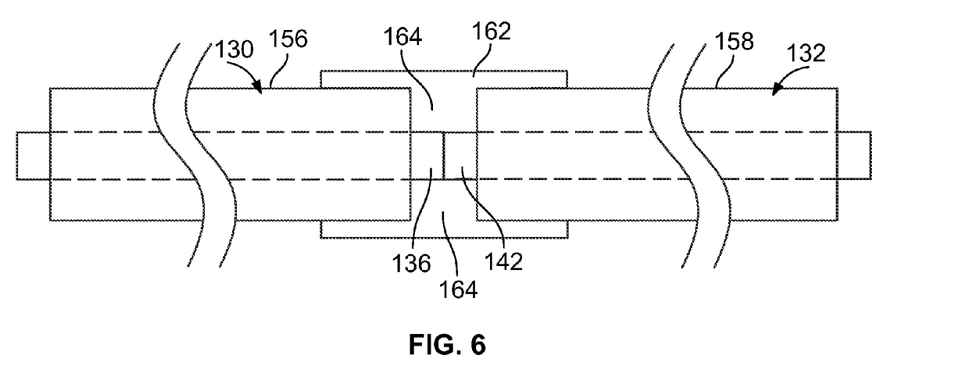
FIG. 6 is a side view of a pair of optical fibers formed in accordance with an embodiment and coupled in accordance with an embodiment.

FIG. 6 is a side view of a pair of optical fibers 130 and 132 coupled with a sealing member 162 formed in accordance with another embodiment. The sealing member 162 is configured to seal the gaps 160 (shown in FIG. 5). The sealing member 162 includes a magnet sealing portion 164. The magnet sealing portion 164 extends radially inward from the outer surfaces 156 and 158 of the optical fibers 130 and 132, respectively. The magnet sealing portion 164 extends around each of the magnetic elements 136 and 142. The magnet sealing portion 164 may prevent movement of the magnetic elements 136, 142 with respect to each other and/or with respect to the cores 134, 140 of the respective optical fibers 130, 132.

The sealing member 162 may be formed from any of the materials described in FIG. 5 with respect to the sealing member 150. Additionally, the sealing member 162 may perform any of the functions described in FIG. 5 with respect to the sealing member 150.

Figure 7:
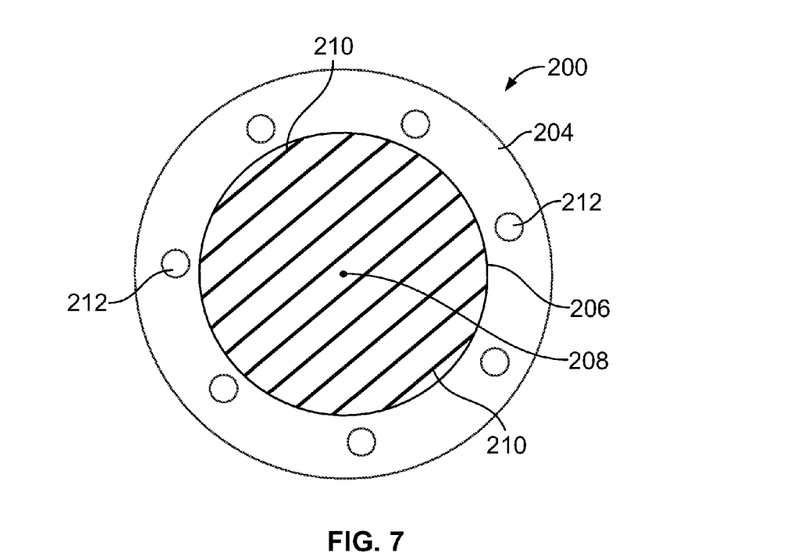
FIG. 7 is an end view of an optical fiber formed in accordance with another embodiment.

FIG. 7 is an end view of an optical fiber 200 formed in accordance with another embodiment. The optical fiber 200 includes a core (not shown) having a cladding 204 positioned there around. A magnetic element 206 is positioned over the core. The magnetic element 206 may be any suitable magnetic element as described above. The magnetic element 206 is aligned with the core. For example, a center 208 of the magnetic element 206 may be aligned with a center (not shown) of the core, as described above. The magnetic element 206 includes magnetic particles 210 impregnated therein. The magnetic particles 210 are polarized to give the magnetic element 206 one of a negative polarity or a positive polarity. The magnetic element 206 is configured to align the core of the optical fiber 200 with the core of another optical fiber.

In the illustrated embodiment, the cladding 204 includes attachment mechanisms 212 positioned therein. The attachment mechanisms 212 are configured to provide additional alignment of the optical fiber 200 with respect to another optical fiber. The attachment mechanisms are used in conjunction with the magnetic element 206 to align the optical fiber 200. For example, the magnetic element 206 provides core-to-core alignment of the optical fiber 200 with respect to another optical fiber, whereas, the attachment mechanisms 212 provide additional support around the core of the optical fiber 200. The attachment mechanisms 212 may facilitate maintaining alignment of the magnetic element 206 with the magnetic element of another optical fiber. The attachment mechanisms 212 may also facilitate maintaining alignment of the core with respect to the core of another optical fiber. Additionally, the attachment mechanisms 212 may prevent decoupling of the optical fiber 200 from another optical fiber when at least one of the optical fibers is moved or exposed to a force. For example, forces on the optical fiber 200 may cause the magnetic element 206 to become disengaged from the magnetic element of another optical fiber. The attachment mechanisms 212 may provide a force to limit or prevent decoupling of the magnetic elements.

Figure 8:
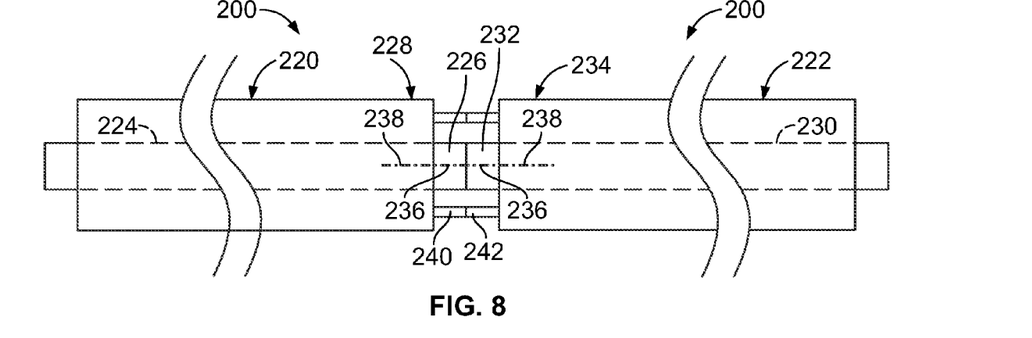
FIG. 8 is a side view of a pair of optical fibers formed in accordance with another embodiment and coupled in accordance with an embodiment.
Figure 9:
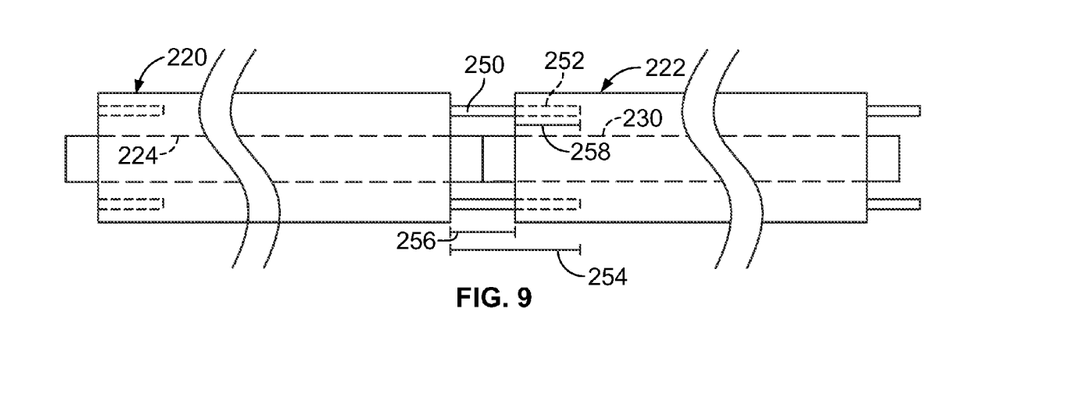
FIG. 9 is a side view of a pair of optical fibers formed in accordance with another embodiment and coupled in accordance with another embodiment.

The attachment mechanisms 212 may be formed as magnetic elements (as illustrated in FIG. 8) that are configured to couple to the magnetic elements of another optical fiber. Alternatively, the attachment mechanisms 212 may be formed as pins and sockets (as illustrated in FIG. 9) that are configured to engage corresponding mechanisms of another optical fiber. It should be noted that the attachment mechanisms are not limited to magnetic elements or pins and sockets. Rather, the attachment mechanisms may be any suitable attachment mechanism known in the art.

FIG. 8 is a side view of a pair of optical fibers 200 coupled in accordance with an embodiment. The pair of optical fibers 200 includes a first optical fiber 220 and a second optical fiber 222. The first optical fiber 220 has a core 224. The core 224 is covered with a magnetic element 226 at an end 228 of the first optical fiber 220. The second optical fiber 222 has a core 230. The core 230 is covered with a magnetic element 232 at an end 234 of the second optical fiber 222. The magnetic element 226 has a first polarity and the magnetic element 232 has a second polarity that is opposite the first polarity. As such, the magnetic element 226 and the magnetic element 232 are attracted to one another.

The magnetic element 226 is coupled to the magnetic element 232 to couple the core 224 of the first optical fiber 220 to the core 230 of the second optical fiber 222. The core 224 and the core 230 are aligned by the magnetic elements 226 and 232. In one embodiment, the core 224 and the core 230 are aligned with respect to a center 236 (for example, the center 208 shown in FIG. 7) of each magnetic element 226, 232, and a center 238 of each core 224, 230. The cores 224 and 230 are aligned to enable optical signals to pass between the cores 224 and 230. The optical signals pass from one of the cores 224 or 230, through the magnetic elements 226 and 232, and into the other core 224 or 230.

The optical fiber 220 includes attachment mechanisms 240 (for example, the attachment mechanisms 212 shown in FIG. 8), and the optical fiber 222 includes attachment mechanisms 242 (for example, the attachment mechanisms 212 shown in FIG. 8). In the illustrated embodiment, the attachment mechanisms 240 and 242 are configured as magnetic elements. Alternatively, the attachment mechanisms 240 and 242 may have any other suitable means for coupling to one another. The attachment mechanisms 240 have a first polarity and the attachment mechanisms 242 have a second polarity that is opposite to the first polarity. Accordingly, the attachment mechanisms 240 are attracted to the attachment mechanisms 242. The attachment mechanisms 240 are coupled to the attachment mechanisms 242 to provide additional coupling between the optical fiber 220 and the optical fiber 222. For example, the attachment mechanisms 240, 242 may prevent the optical fibers 220 and 222 from becoming disengaged.

The attachment mechanisms 240 and 242 extend around a circumference of the respective optical fibers 220 and 222 (as illustrated with respect to the attachment mechanisms 212 shown in FIG. 7). The attachment mechanisms 240 and 242 extend around a circumference of the respective optical fibers 220 and 222 to provide coupling around the circumference of the optical fibers 220 and 222. Additionally, the attachment mechanisms 240 and 242 extend around a circumference of the respective optical fibers 220 and 222 to provide coupling around the respective cores 224 and 230 of the optical fibers 220 and 222. In one embodiment, the optical fibers 220 and 222 may be sealed with a sealing member, for example, the sealing member 150 shown in FIG. 5, the sealing member 162 shown in FIG. 6, or any other suitable sealing member.

FIG. 9 is a side view of the optical fibers 220 and 222 coupled in accordance with another embodiment. The optical fiber 220 includes attachment mechanisms 250 (for example, the attachment mechanisms 212 shown in FIG. 8), and the optical fiber 222 includes attachment mechanisms 252 (for example, the attachment mechanisms 212 shown in FIG. 8). The attachment mechanisms 250 are formed as pins, and the attachment mechanisms 252 are formed as sockets. The attachment mechanisms 250 are configured to be received within the attachment mechanisms 252. In one embodiment, the attachment mechanisms 250 may include ribs, barbs, or the like to create an interference fit with the attachment mechanisms 252. In another embodiment, the attachment mechanisms 250 may be tapered and/or have a circumference that is greater than a circumference of the attachment mechanisms 252. In such an embodiment, the attachment mechanisms 250 and/or the attachment mechanisms 252 may be deformable to create an interference fit therebetween.

The attachment mechanisms 250 extend a length 254 from the optical fiber 220. The length 254 is greater than a combined length 256 of the magnetic elements 226 and 232. The attachment mechanisms 150 extend past the magnetic elements 226 and 232, when the optical fibers 220 and 222 are coupled. The attachment mechanisms 252 extend into the optical fiber 222 a length 258. The length 258 is configured to receive the attachment mechanisms 250, while permitting coupling of the magnetic elements 226 and 232. The attachment mechanisms 250 are coupled to the attachment mechanism 252 to provide additional coupling between the optical fiber 220 and the optical fiber 222. For example, the attachment mechanisms 250, 252 may prevent the optical fibers 220 and 222 from becoming disengaged.

The attachment mechanisms 250 and 252 extend around a circumference of the respective optical fibers 220 and 222 (as illustrated with respect to the attachment mechanisms 212 shown in FIG. 7). The attachment mechanisms 250 and 252 extend around a circumference of the respective optical fibers 220 and 222 to provide coupling around the circumference of the optical fibers 220 and 222. Additionally, the attachment mechanisms 250 and 252 extend around a circumference of the respective optical fibers 220 and 222 to provide coupling around the respective cores 224 and 230 of the optical fibers 220 and 222. In one embodiment, the optical fibers 220 and 222 may be sealed with a sealing member, for example, the sealing member 150 shown in FIG. 5, the sealing member 162 shown in FIG. 6, or any other suitable sealing member.

Figure 10:
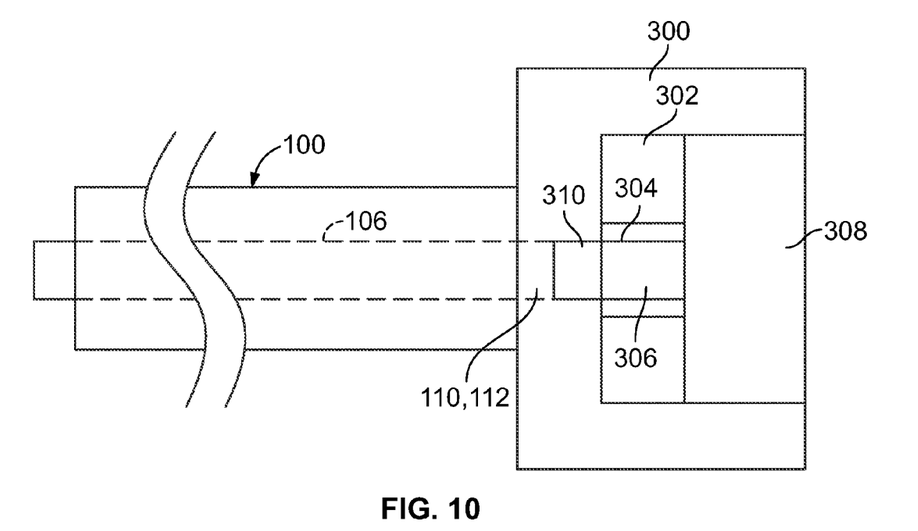
FIG. 10 is a side schematic view of an optical fiber formed in accordance with an embodiment and coupled to an electronic component.

FIG. 10 is a side schematic view of the optical fiber 100 coupled to an electronic component 300. The electronic component 300 may be any suitable electronic component for receiving optical fibers. In one exemplary embodiment, the electronic component 300 is a silicon photonic chip, however other types of electronic components may be used in alternative embodiments. The electronic component 300 includes an interface 302 that is configured to receive optical fibers, cables, wires, card modules, or the like. The interface 302 may be mounted to a circuit board, for example, a printed circuit board, a mother board, a mid-plane circuit board, a back plane circuit board, or the like. In the illustrated embodiment, the interface 302 includes a connector 304. The connector 304 is configured to couple to the optical fiber 100. The connector 304 includes an optical core 306 configured to receive and/or transmit optical signals between the optical fiber 100 and electrical components 308 within the electronic component 300.

A magnetic element 310 is provided in the connector 304. The magnetic element 310 is provided at an end of the optical core 306. For example, a center of the magnetic element 310 may be aligned with a center of the optical core 306. The magnetic element 310 may be similar to the magnetic elements described above. For example, the magnetic element 310 may include an epoxy matrix with magnetic material or particles impregnated therein. The magnetic element 310 is optically transmissive to enable optical signals to pass to and from the optical core 306. The magnetic element 310 is polarized to magnetically connect with a corresponding magnetic element of the optical fiber 100. The magnetic material (e.g. magnetic particles) may include at least one of iron-neodymium-boron alloy, iron-nickel-aluminum alloy, iron-cobalt alloy, iron oxide, barium, strontium, lead oxide or the like.

The magnetic element 310 is polarized to have an opposite polarity from one of the magnetic elements 110, 112 of the optical fiber 100. Accordingly, one of the magnetic elements 110, 112 of the optical fiber 100 is attracted to the magnetic element 310 of the electronic component 300. The magnetic element 110, 112 of the optical fiber 100 is coupled to the magnetic element 310 of the electronic component 300 to align the core 106 of the optical fiber 100 with the optical core 306 of the electronic component 300. The magnetic element 110, 112 and the magnetic element 310 facilitate transmission of optical signals between the optical fiber 100 and the electronic component 300. As will be appreciated, the optical fiber 100 and the electronic component 300 may also include other attachment mechanisms to provide additional support between the optical fiber 100 and the electronic component 300.

Figure 11:
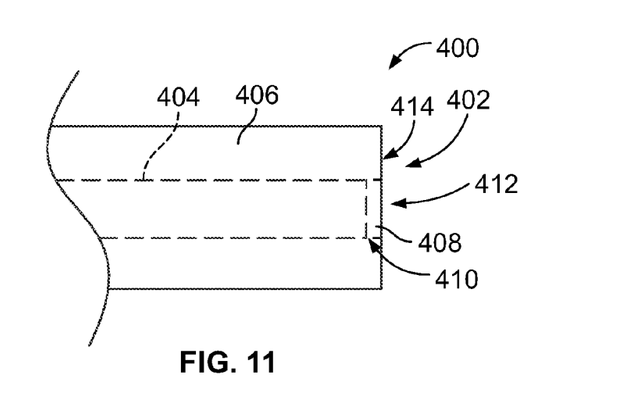
FIG. 11 is a side view of an end of an optical fiber formed in accordance with an exemplary embodiment.

FIG. 11 is a side view of an end 402 of an optical fiber 400 formed in accordance with an exemplary embodiment. The optical fiber 400 includes a core 404 having a cladding 406 extending around a circumference thereof. A magnetic element 408 is positioned at and end 410 of the core 404. The cladding 406 extends around a circumference of the magnetic element 408. An end 412 of the magnetic element 408 is flush with the end 402 of the optical fiber 400. The end 412 of the magnetic element 408 is flush with an end 414 of the cladding 406. In one embodiment, the magnetic element 408 is a magnetic layer applied to the end 410 of the core 404. In one embodiment, the magnetic element 408 coats at least a portion of the core 404. In one embodiment, the magnetic element 408 is applied to an exposed surface of the core 404.

Figure 12:
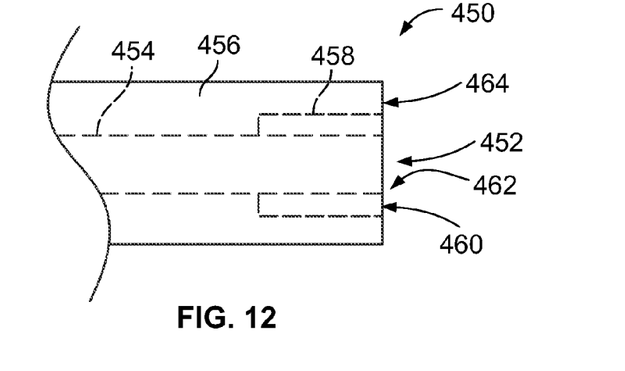
FIG. 12 is a side view of an end of an optical fiber formed in accordance with another exemplary embodiment.

FIG. 12 is a side view of an end 452 of an optical fiber 450 formed in accordance with another exemplary embodiment. The optical fiber 450 includes a core 454 having a cladding 456 extending around a circumference thereof. A magnetic element 458 extends at least partially around a portion of the core 454. The magnetic element 458 is positioned between the cladding 456 and the core 454. An end 460 of the magnetic element 458 is flush with the end 452 of the optical fiber 450. The end 460 of the magnetic element 458 may be flush with an end 462 of the core 454 and/or an end 464 of the cladding 456. In one embodiment, the magnetic element 458 is a magnetic layer applied to the core 454. In one embodiment, the magnetic element 458 coats at least a portion of the core 454.

The various embodiments provide an optical fiber having a magnetic element to provide core-to-core alignment with another optical fiber or electronic component. Magnetic elements are provided at each end of the optical fiber. The magnetic element may be impregnated with a magnetic material, in the form of nano-particles, which are sized and spaced to enable optical signals to pass through the magnetic element. The optical fiber is coupled to another optical fiber by engaging the magnetic element with a magnetic element of the other optical fiber. The magnetic elements couple the cores of each optical fiber to maintain an alignment of the optical fiber cores. The light transmission path for the optical signals includes the cores of the optical fibers as well as the magnetic elements of the optical fibers. The optical fibers may also be provided with a sealing member and/or attachment mechanism to further secure the optical fibers together.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. An optical fiber comprising:
a first end and a second end, the optical fiber extending along a central longitudinal axis between the first end and the second end;
a core for transmitting optical signals from the first end to the second end, the core having an end surface at the first end, the end surface being perpendicular to the central longitudinal axis, the end surface configured to face an end of a core of another optical fiber;
a cladding positioned around a circumference of the core; and
a magnetic element at the end surface of the first end, the magnetic element being ferromagnetic and being configured to magnetically couple the core to the core of the another optical fiber to mechanically and optically connect the first end to the end of the core of the another optical fiber, the magnetic element being optically transmissive and being positioned relative to the end surface and the another optical fiber such that the optical signals propagate directly through the magnetic element.

2. The optical fiber of claim 1, wherein the magnetic element is a magnetic layer having magnetic nano-particles, the magnetic nano-particles being ferromagnetic, the magnetic layer coating at least a portion of the corresponding end surface of the core.

3. The optical fiber of claim 1, wherein the magnetic element is a magnetic layer applied to the end surface of the core.

4. The optical fiber of claim 1, wherein the magnetic element is impregnated with at least one of iron-neodymium-boron alloy, iron-nickel-aluminum alloy, iron-cobalt alloy, iron oxide, barium, strontium, or lead oxide.

5. The optical fiber of claim 1, wherein the magnetic element extends from the core beyond an end of the cladding, the magnetic element forming part of a light transmission path defined by the core.

6. The optical fiber of claim 1, wherein the magnetic element is provided on an exposed surface of the core.

7. The optical fiber of claim 1, wherein the optical fiber and the another optical fiber are sealed with a heat shrink tubing after being coupled.

8. The optical fiber of claim 1, wherein the magnetic element is formed from a matrix of epoxy having magnetic nano-particles impregnated therein, the magnetic nano-particles being ferromagnetic, the epoxy being cured to the corresponding end surface of the core.

9. The optical fiber of claim 1, wherein the end surface of the magnetic element abuts against an end surface of the end of the another optical fiber in a light carrying manner.

10. The optical fiber of claim 1, wherein the magnetic elements are mechanically aligned such that a center of the core of the first optical fiber and a center of the core of another optical fiber are aligned.

11. The optical fiber of claim 1, wherein the magnetic elements are coupled to one another such that the cores remain aligned while the optical fiber is exposed to movement.

12. An optical fiber assembly comprising:
a first optical fiber and a second optical fiber coupled to the first optical fiber, the first optical fiber comprising:
a first core for transmitting optical signals between a first end and a second end of the first optical fiber, the first core having an end surface at the first end; and
a first optically transmissive magnetic element at the end surface of the first end, the first optically transmissive magnetic element being ferromagnetic;
the second optical fiber comprising:
a second core for transmitting optical signals between a first end and a second end of the second optical fiber, the second core having an end surface at the second end;
a second optically transmissive magnetic element at the end surface of the second end, the second optically transmissive magnetic element being ferromagnetic and attracted to the first optically transmissive magnetic element;
wherein the first optically transmissive magnetic element of the first optical fiber mechanically couples to the second optically transmissive magnetic element of the second optical fiber such that the core of the first optical fiber is aligned with the core of the second optical fiber, and wherein the first optically transmissive magnetic element of the first optical fiber optically couples to the second optically transmissive magnetic element of the second optical fiber such that optical signals are transmitted to and through the first and second optically transmissive magnetic elements.

13. The optical fiber assembly of claim 12, wherein the first optical fiber further comprises a third optically transmissive magnetic element at the second end and the second optical fiber further comprises a fourth optically transmissive magnetic element at the first end.

14. The optical fiber assembly of claim 12, wherein
the first optical fiber further comprises a first cladding positioned around a circumference of the first core;
the second optical fiber further comprises a second cladding positioned around a circumference of the second core;
the first cladding of the first optical fiber and the second cladding of the second optical fiber having the first and second optically transmissive magnetic elements at the end surfaces thereof to mechanically couple the first cladding of the first optical fiber and the second cladding of the second optical fiber.

15. The optical fiber assembly of claim 14, wherein the first cladding of the first optical fiber includes an attachment member configured to receive an attachment member on the second cladding of the second optical fiber.

16. The optical fiber assembly of claim 12, wherein the first magnetic element of the first optical fiber has a magnetic polarization opposite of a magnetic polarization of the first magnetic element of the second optical fiber.

17. The optical fiber assembly of claim 12, wherein the first core of the first optical fiber includes a center; the second core of the second optical fiber includes a center; the center of the first optical fiber aligns with the center of the core of the second optical fiber when the first optical fiber couples to the second optical fiber.

18. The optical fiber assembly of claim 12, wherein the magnetic element of the first optical fiber abuts against the magnetic element of the second optical fiber.

19. An optical fiber comprising:
a first end and a second end, the optical fiber extending along a central longitudinal axis between the first end and the second end;
a first core for transmitting optical signals from the first end to the second end, the first core having an end surface at the first end, the end surface being perpendicular to the central longitudinal axis, the end surface configured to face an end of a second core of another optical fiber;
a cladding positioned around a circumference of the first core; and
a magnetic element at the end surface of the first end, the magnetic element being ferromagnetic and having a positive polarity, the magnetic element being configured to magnetically couple the first core to the second core of the another optical fiber to mechanically and optically connect the first end to the end of the core of the another optical fiber, the magnetic element being optically transmissive such that the optical signals propagate directly through the magnetic element.

20. The optical fiber of claim 19, wherein the magnetic element forms a light transmissive path defined by the first core.

21. The optical fiber of claim 19, wherein the magnetic element magnetically couples the first core to the second core of said another optical fiber to ensure that the first core is aligned with the second core.

22. The optical fiber of claim 21, further comprising an attachment member at the first end configured to couple to an attachment member of the another optical fiber.

* * * * *